Dec. 13, 1927.

F. STOEHRER

AMUSEMENT DEVICE 1,652,840

Original Filed Oct. 26, 1923    2 Sheets-Sheet 1

Inventor
Fred Stoehrer,

Dec. 13, 1927.

F. STOEHRER

AMUSEMENT DEVICE

Original Filed Oct. 26, 1923   2 Sheets-Sheet 2

1,652,840

Inventor
Fred Stoehrer,

WITNESSES:—

By
Attorney

Patented Dec. 13, 1927.

1,652,840

UNITED STATES PATENT OFFICE.

FRED STOEHRER, OF METHUEN, MASSACHUSETTS, ASSIGNOR TO STOEHRER AND PRATT DODGEM CORPORATION, OF LAWRENCE, MASSACHUSETTS, A CORPORATION OF MASSACHUSETTS.

AMUSEMENT DEVICE.

Application filed October 26, 1923, Serial No. 670,991. Renewed November 18, 1924.

This invention relates to amusement apparatus of the type shown in patents granted to Max Stoehrer and Harold Stoehrer Nos. 1,373,108, March 29, 1921, and 1,467,959, September 11, 1923.

More particularly the invention has in view a light and practical car, adapted to travel on a metal floor constituting one terminal of an electric circuit, the other terminal being formed by an open wire-mesh ceiling or overhead structure which is traversed by a suitable trolley that supplies current to the propelling motor of the car. That is to say, it is proposed to provide a car particularly designed to utilize the general features of the cars in the apparatus above referred to in such a way as to reduce manufacturing and assembly costs to a minimum, and yet at the same time incorporate features of construction which safeguard both the occupant and equipment.

To that end, the invention contemplates a car having adequate electrical and mechanical control devices which act automatically to insure the safety of the occupant and operating mechanism.

A still further object of the invention is to provide a novel and practical slip clutch.

With the above and other objects in view, which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Similar reference characters designate corresponding parts throughout the several figures of the drawings.

Figure 1:
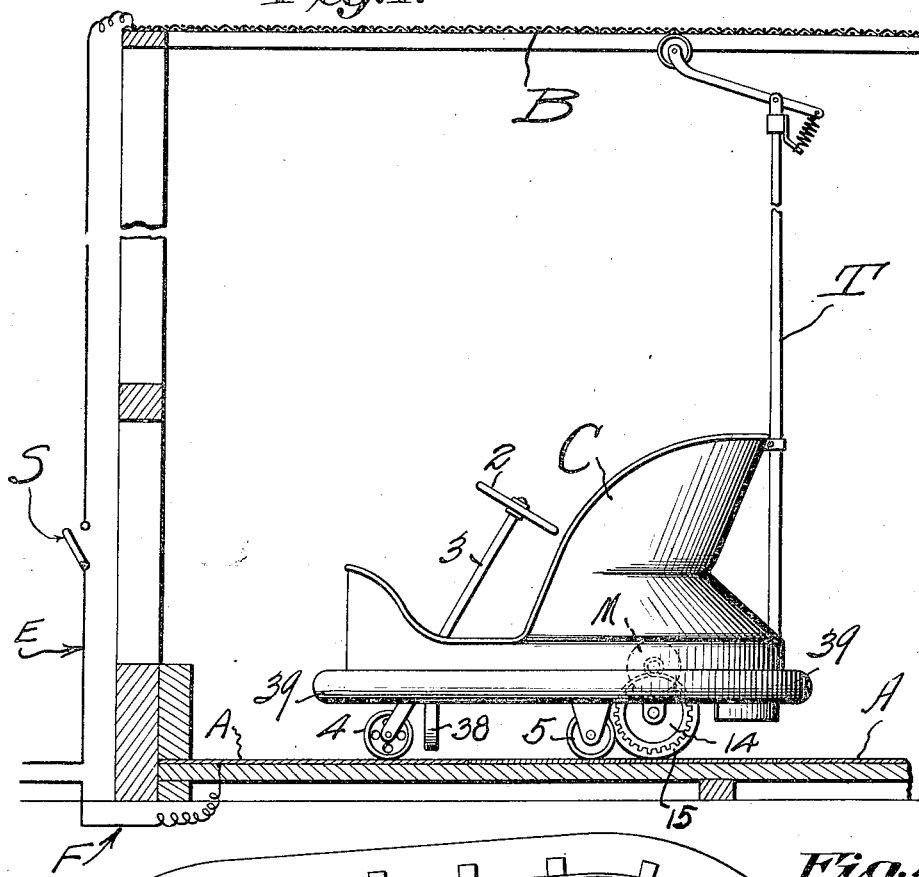
Figure 1 is a view illustrating the use of a car constructed in accordance with the present invention.

In carrying the invention into effect, it is proposed, as previously indicated, to provide a car that is thoroughly safe for the occupant and which also avoids unnecessary maintenance expenses.

Normally the trolley is always in contact with the over-head ceiling and the supporting wheels are in contact with the metal floor, and thus it is, of course, desirable that the circuit to the motor be open when the car is unoccupied so that if there are any empty cars on the floor, when the main or master switch is closed, they will not move.

Therefore, it is proposed to provide a safe and foolproof automatic switch which controls the circuit to the driving motor in such a way that the circuit is closed only when the car is occupied, but opened when it is unoccupied, and to also provide means which requires the operator to intentionally operate the same to cause the car to travel.

Referring to the drawings, it will be observed that A designates the metallic platform on which the car or cars travel; B is the open mesh wire ceiling and C designates the car which embodies the novel features of the present invention. The floor A and ceiling B are supplied with current from any suitable source by the line wires E and F, one of which has a main or master switch designated at S. This switch is usually controlled by the owner or operator of the entire outfit and when the time for starting the ride arrives he closes the switch and lets the same stay closed until the period of the ride, for example five or ten minutes is over. He then opens the switch which brings all of the cars, wherever they may be on the floor to rest, the individual operators having no further control thereover.

While the master switch is closed, however, the switch S' and slip clutch device D are ready to function, and referring to the manner in which they are embodied in the car C, it will be observed that the said motor control switch S' is located beneath the seat 1, and the clutch device D is carried by the floor of the car. A hand-wheel 2 is located in front of the occupant's seat and is connected by the shaft 3 to a dirigible steering wheel 4 which travels upon the floor A. This wheel 4, together with the wheels 5—5 provide travelling supports for the platform or floor 6 of the car whereby the car may be guided over the floor A at the will of the operator. At the rear of the seat 1 the car is equipped with a trolley T for carrying one of the line wires 7 which connects with one terminal 8 of the occupant controlled motor-switch S', the other terminal 9 of which is carried by the bottom of the seat 1.

Figure 2:
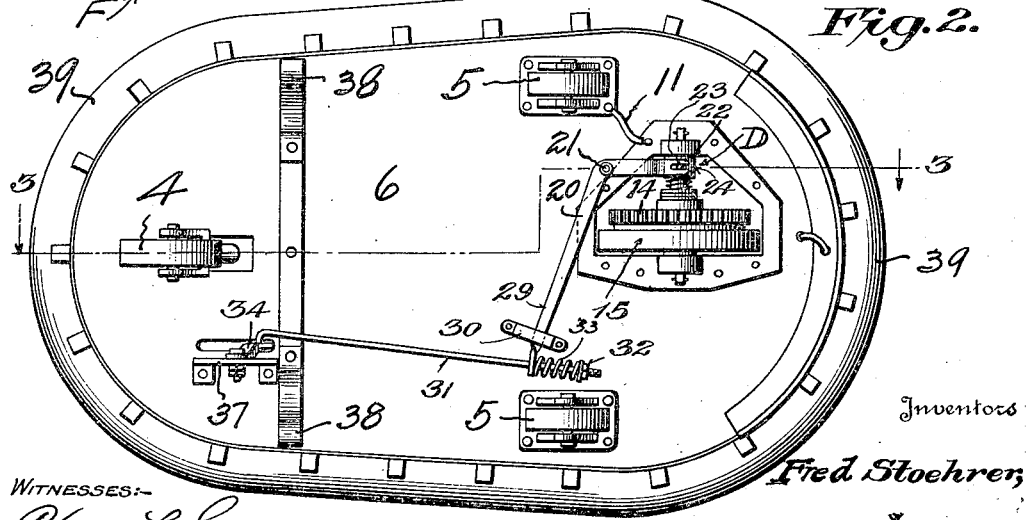
Figure 2 is a bottom plan view of the car.
Figure 3:
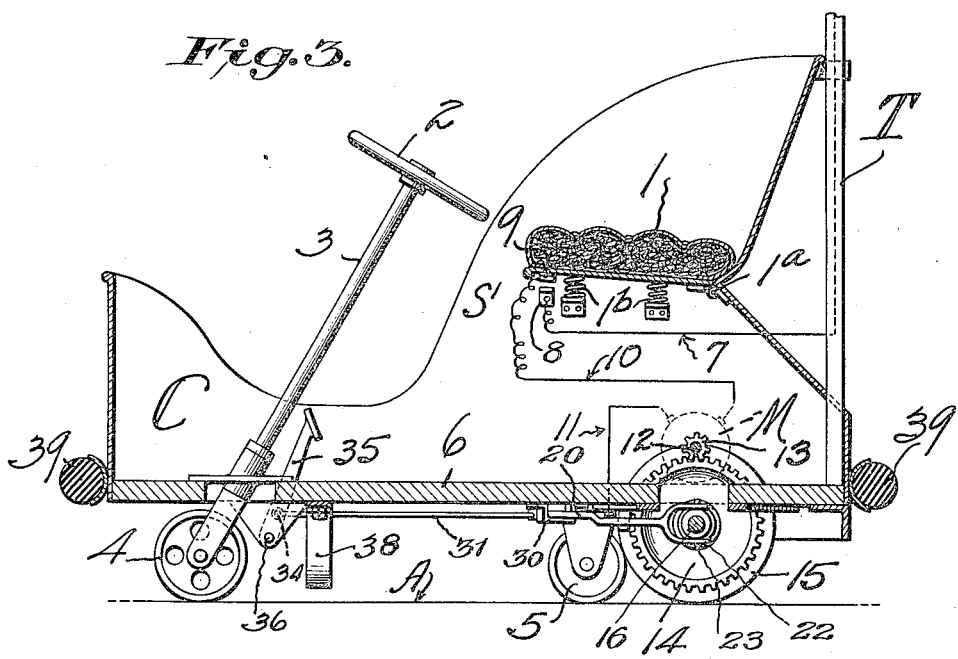
Figure 3 is a vertical longitudinal sectional view taken on the line 3—3 of Figure 2.

As shown in Figure 3, the said seat 1 is hingedly supported as at 1ª and normally rests on the suporting springs 1ᵇ in such a way that the terminals 8 and 9 of the switch S' are held out of contact. However, when the occupant is seated in the car, his weight will cause the springs 1ᵇ to compress and permit the terminals 8 and 9 to be engaged and thus close the circuit from the trolley wire 7 to the motor M through the line wire 10. The said motor M is grounded through the wire 11 to one of the wheels 5 as indicated in Figures 2 and 3, and therefore when the circuit is closed through the switch S' the motor M will operate, providing of course, the master switch S is still closed.

The said motor M has its shaft 12 lifted with a driving pinion 13 which is adapted to mesh with the shiftable clutch gear 14 of the novel clutch device D which controls the operation of the main driving wheel 15. The said wheel 15 is keyed to a shaft 16 which is journaled in the roller bearings 17 and 18, whereby it may freely rotate when coupled to the motor to propel the car, and one side is provided with a friction facing 19 adapted to be engaged by the side face of the driving gear 14.

The said driving gear 14 is loosely mounted on the shaft or spindle 16 and is normally free of the friction face or ring 19. However, when the occupant desires the car to travel he causes gear 14 to frictionally engage with the face 19 of the wheel 15 by moving the cranked shifter lever 20 which is pivoted as at 21 to the bottom of the platform 6. This lever is provided with the yoke arms 22 which engage with the studs 23 on the collar 24 loosely mounted on the flanged sleeve 25 which in turn is loosely mounted on the shaft 16. A normally inert pressure spring 26 is arranged between the collar 24 and the flange of the sleeve 25, and when compressed by the movement of the lever 20, holds the friction gear wheel 14 into firm frictional engagement with the friction surface or ring 19 of the traction wheel 15, thereby causing the latter to turn but permitting the gear and wheel to have a relative slippage when the car meets a blockade or the like. As soon as the occupant releases the foot pressure on the connections for the lever 20 the frictional connection is at once broken.

A suitable ball race 27 is provided between the lubricant cup 28 and the sleeve so as to permit the gear 14 to rotate on the shaft 16 without imparting motion to the sleeve 25.

Figure 4:
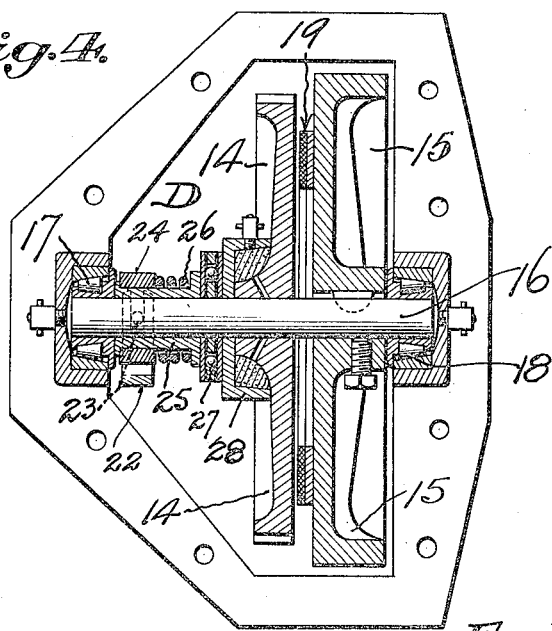
Figure 4 is an enlarged detail horizontal section of the driving wheel and clutch therefor.

The arm 29 of the lever 20 is guided in a strap 30 as shown in Figure 2 and the extreme end thereof receives a link 31 which carries at one end thereof a nut-and-washer abutment 32 to thereby confine between the extremity of the arm 29 and the abutment a suitable spring 33. The front end of the link 31 is connected as at 34 with the foot lever 35 which is pivoted as at 36 in a bracket 37 attached to the underside of the platform 6. When the operator places his foot on the pedal 35 and pushes it forward the link 31 moves forward and carries with it the spring 33 which engages the arm 29 of the clutch shifting lever 20. As the arm 29 is moved forward the yoke 22 is moved so as to compress the spring 26 and shift the gear 14 into binding engagement with the driving wheel 15. On the other hand, when the operator releases the foot pedal 35 the gear 14 will disengage the friction ring 19 as shown in Figure 4 and permit the car to come to a standstill.

It will, of course, be understood that the teeth of the gear 14 are of sufficient width to engage with the driving pinion 13 of the motor when the wheel is shifted to an operative or inoperative position. Also, the bottom of the car may be equipped with depending supports 38 wherever desired so as to prevent overturning when taking a sharp turn; and the outside of the car body may be equipped with the bumper 39 which may be of the cushion or pneumatic type.

From the foregoing it will be apparent that when the master switch S is closed to charge the floor A and ceiling B, the cars C on the floor A will not move until the intended occupant places himself on the seat 1 and also puts his foot on the clutch pedal 35 and pushes it forward. The act of the occupant being seated closes the circuit to the motor M, but the further act of requiring him to throw in the clutch for connecting the motor with the drive wheel 15 must be completed before the car will move. If an operator stands up and still keeps his foot on the pedal 35 the car will stop. Or, if the occupant remains seated and takes his foot off the clutch pedal 35 the car will also come to a stop even though other cars on the floor A may still be running. These two features of occupant control enable the occupant to stop to avoid a jam and also makes it possible to control each car individually while the master switch is closed.

Without further description it is thought that the features and advantages of the invention will be readily apparent to those skilled in the art, and it will, of course, be understood that changes in the form, proportion and minor details of construction may be resorted to without departing from the spirit of the invention and scope of the appended claims.

I claim:

1. An amusement apparatus of the class described including the combination with a floor and a ceiling of an electrical conducting material and an electrical circuit, of a car platform carrying travelers adapted to travel on said floor, a driving wheel engaging the floor, a motor electrically in circuit with the floor and ceiling, a normally-open seat-switch included in the circuit with the motor, and a normally open manually operated clutch connection between the motor and the drive wheel.

2. An amusement apparatus of the class described adapted to operate in connection with a floor and a ceiling forming a part of an electrical circuit, said apparatus comprising a car having a motor thereon and adapted to be included in circuit with said floor and ceiling, a propelling wheel, a normally disengaged manually operated clutch device between the propelling wheel and the motor, and a normally open seat controlled switch included in the circuit with the motor and the floor and ceiling thereby only to close the circuit to the motor when the seat is occupied.

3. An amusement apparatus of the class described, including a car having travelling supports, a driving wheel, having a friction facing on one side thereof, a motor driven gear concentric with the driving wheel, means for normally holding said gear out of engagement with said friction facing, said means including a cranked lever pivotally supported by the bottom of the car, a foot pedal pivoted in the floor of the car and a link connection between said foot pedal and the crank lever.

4. An amusement apparatus of the class described adapted to operate in connection with a floor and a ceiling forming a part of an electric circuit, said apparatus comprising a car platform having a motor thereon and adapted to be included in circuit with said floor and ceiling, a propelling wheel carried by the platform, a normally disengaged clutch device providing the operative connection between the propelling wheel and motor, a clutch controlling connection carried by the platform and having a manual actuating element exposed to the occupant of the car, and a universally swiveled manually controlled steering caster mounted at the front part of the car platform in advance of the propelling wheel.

In testimony whereof I hereunto affix my signature.

FRED STOEHRER.